3,663,727
Patented May 16, 1972

3,663,727
PROCESS FOR PURIFICATION OF POLYMER SOLUTION
Akira Yamamoto, Toyoharu Miyako, and Kiyoshi Maeda, Yokkaichi-shi, Japan, assignors to Mitsubishi Petrochemical Co., Ltd., Tokyo, Japan
No Drawing. Filed Sept. 29, 1969, Ser. No. 862,034
Claims priority, application Japan, Oct. 3, 1968, 43/72,017
Int. Cl. C08d 5/00, 5/02; C08f 1/88
U.S. Cl. 260—80.78    8 Claims

ABSTRACT OF THE DISCLOSURE

A process for the purification of a polymer solution which comprises removing the polymerisation catalyst from a polymer solution obtained by solution-polymerising a monomer or monomers in a water-immiscible inert organic solvent in the presence of a polymerisation catalyst soluble in said solvent, characterised by mixing said polymer solution with water in the presence of a surface active agent to thereby form a first emulsion of water in polymer solution type, subsequently mixing said first emulsion with additional water to induce phase inversion of said first emulsion to a second emulsion of polymer solution in water type, and separating a water phase from the second emulsion.

---

This invention relates to a process for the purification of a polymer solution containing a polymerisation catalyst by removing the catalyst and its decomposition products from the polymer solution with improved efficiency and with good reproducibility.

More particularly, it relates to a process for the purification of a polymer solution which comprises removing the polymerisation catalyst from a polymer solution obtained by solution-polymerising a monomer in a water-immiscible inert organic solvent in the presence of a polymerisation catalyst soluble in said solvent, characterised by mixing said polymer solution with water in the presence of a surface active agent to thereby form a first emulsion of water in polymer solution type, subsequently mixing said first emulsion with additional water to induce phase inversion of said first emulsion to a second emulsion of polymer solution in water type, and separating a water phase from the second emulsion.

It is known that in the production of olefin polymers by catalytic polymerisation, for instance, the resulting polymers undergo coloration and contain ash ascribable to the metal components of the catalyst, and various proposals have been made to remove this defect.

As one type of such proposal, various attempts have been made to remove catalysts from solid polymers by treating them.

For instance, U.S. Pat. 2,699,457 proposes the washing of a solid polymer with water, alcohols or an aqueous solution of an acid or an alkali hydroxide. However, the resulting final white polymer is again colored by heat applied in its fabrication, and also has a considerably high ash content.

Another type of prospal contemplates the treatment of a polymer in a solution form with water, for instance, for preventing such coloration and reducing the ash content to a greater degree. For example, Japanese patent application publication No. 13,046/60 or its equivalent Italian Pat. 565,720 discloses a method of washing a polymer in a solution form with a treating agent such as mineral acids, alkali metal hydroxides, alkali metal salts of organic acids, aliphatic alcohols, aliphatic ketones, aliphatic organic acids, esters of aliphatic alcohols and aliphatic organic acids, water which may contain a chelating agent, and most excellently water alone. As a similar method, Japanese patent application publication No. 8,737/62 or its equivalent Italian Pat. 617,460 describes a method involving adding to a copolymer solution 2–5% by weight, based on said solution, of water to insolubilise the catalyst and separating the insolubilised catalyst or a water phase containing it by such means as filtration and centrifugal separation.

These proposals in which polymers in a liquid form instead of a solid form are contacted with water give improved results on the removal of catalysts, as compared with the treatment of solid polymers. Appreciable amounts of catalyst metals, however, still remain in the polymers, and a further, thorough removal is desired. Moreover, they do not prove sufficiently satisfactory because of poor reproducibility of the removing effect and also of the reproducibility of quality of the polymers obtained. If a polymer solution to be treated has a high viscosity, for instance, above 8000 centipoises, it is extremely difficult to achieve the object of removing catalysts satisfactory.

After an extensive reseach work conducted with a view to providing improved methods by which the defects of prior art methods can be removed, we have found that catalysts can be removed from polymer solutions effectively to a far more improved degree than the above-mentioned proposals for washing-treatment of polymer solutions by employing a process comprising forming a first emulsion of a polymer solution of water in polymer solution type (may be referred to as W/O type), adding water to the first emulsion to cause phase inversion of the W/O type first emulsion to a second emulsion of polymer solution in water type (may be referred to as O/W type) and removing a water phase from the second emulsion.

Accordingly, an object of the present invention is to provide a process for the purfication of a polymer solution by which a remarkably improved degree of catalyst removal can be achieved with the catalyst being separable by a mere standing without resorting to any particular separating means, the reproducibility of removing effect is good, and therefore, an excellent reproducibility of the quality of the resulting purified polymer is provided.

Many other objects and advantages of the present invention will become apparent from the following description.

The process of the invention is applicable to the removal of the polymerisation catalyst from a polymer solution obtained by solution-polymerising a monomer in a water-immiscible inert organic solvent in the presence of a polymerisation catalyst soluble in the solvent. For instance, it is advantageously applicable to the removal of the catalyst from a highly viscous solution of an ethylene-propylene rubber which is obtained by copolymerising ethylene with propylene, or ethylene, propylene and a non-conjugated diene, such as dicyclopentadiene, 1,4-hexadiene, ethylidene norbornene and methyltetrahydroindene, in the presence of a hydrocarbon or a halogenated hydrocarbon using a catalyst composed of an organoaluminium compound and a vanadium compound. It can also be applied to the purification of polybutadiene or polyisoprene obtained by solution-polymerisation.

Any catalysts known to catalyse the solution-polymerisation of the monomer or monomers to be used can be employed. The only requirement for such catalysts is that they should be soluble in the water-immiscible inert organic solvents (inert to the catalysts) used. The so-called Ziegler-type catalysts are most typical, and we can cite catalysts consisting of compounds of metals of Groups IV to VIII of the Periodic Table and organo-metallic compounds of metals of Groups I to III of the Periodic Table. For example, catalysts consisting of vanadium or titanium halides and oragnoaluminium compounds are conveniently used. As specific examples of these catalysts, we can mention catalysts consisting of $VCl_4$, $VOCl_3$,

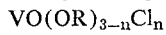

or $VO(AcAc)_3$ and $AlR_3$, $AlR_2Cl$ or $Al_2R_3Cl_3$ for producing an ethylene-propylene rubber in the presence or absence of a non-conjugated diene; catalysts consisting of $VOCl_3$, $VCl_4$, $TiCl_4$ or $CoCl_2$ and $AlR_3$, $LiAlH_4$ or $AlR_2Cl$ for the production of polybutadiene; catalysts consisting of $VCl_4$, $Ti(OR)_4$ or $CoCl_2$ and $AlR_3$ or $AlR_2Cl$ and organolithium compounds for the production of polyisoprene.

In the present invention, catalysts are removed after being transferred to an aqueous phase. It is rare however that they are transferred to the aqueous phase in the form of the catalyst compounds as used in polymerisation, and in most cases, they take the form of the catalyst decomposition products in the aqueous phase. Thus, the water-solubility of the polymerisation catalysts in the present invention includes that of the catalyst decomposition products.

The solvents used in the polymerisation are inert organic solvents which are immiscible with water. Since polymerisation products which the present invention intends to treat are in the form of a solution, the above-mentioned solvents are of course those which dissolve the resulting polymers. Examples of such solvents are aliphatic hydrocarbons such as pentane, hexane and heptane; alicyclic hydrocarbons such as cyclohexane and methylcyclohexane; aromatic hydrocarbons such as benzene, toluene and xylenes; and halogenated hydrocarbons such as tetrachloroethylene, trichloroethylene and monochlorobenzene.

Procedures and conditions for solution-polymerisation are well known in the art. In the present invention, suitable procedures and conditions are those which form a solution of a polymer or copolymer in the water-immiscible inert organic solvent along with the catalyst soluble in it.

The process of the present invention used in the purification of such solution-polymerisation product is characterised by mixing the polymer solution with water in the presence of a surface active agent to thereby form a first emulsion of water in polymer solution type, subsequently mixing said first emulsion with additional water to induce phase inversion of said first emulsion to a second emulsion of polymer solution in water type, and separating a water phase from the second emulsion. The objects of the present invention cannot be achieved by the conventional proposals of water-treating polymerisation products in liquid form in which without effecting such phase inversion, the catalyst is insolubilised by addition of a small amount of water or an O/W type emulsion is prepared initially by addition of a great quantity of water.

The process of the present invention is operated so that the formation of a first emulsion of the W/O type, the phase inversion of the first emulsion, and the formation of a second emulsion of the O/W type will be conducted in this order.

The following are considered to be the advantages of utilising phase inversion in the present invention.

(1) For extracting a catalyst from a polymer, the W/O state is more preferable than the O/W state. In the case of the W/O type, water droplets move in oil, and there is a large possibility that all parts of the oil will come into contact with water. Where oil droplets move in water (i.e., in the case of the O/W type), the inner parts of the oil droplets are difficult to contact with water.

(2) At the time of phase inversion, a continuous phase of oil is taken over by water, and at this time, an area of contact of oil with water becomes maximum. This is a very important stage for the removal of products derived from the decomposition of catalysts.

(3) Consequently, the water droplets containing much catalyst decomposition products before phase inversion are released by the phase inversion and get together with a large quantity of fresh water to serve for the reduction of the concentrations of the catalyst decomposition products in water.

In the case of separating water and a high viscous polymer solution from each other, only a small quantity of water moves in the highly viscous polymer solution in the W/O state, and therefore separation of water by a mere standing necessitates a long time. Hence, for effecting a practical separation, such means as centrifugal separation and filtration become necessary. In the case of the O/W type, however, they are readily separated from each other by mere standing.

Thus, according to the process of the present invention, an effect of catalyst extraction is very great. Removal of water from the polymer solution is achieved by standing, and such operations as filtration and centrifugal separation and separating means not beneficial to the apparatus are not necessary at all. Furthermore, the reproducibility of catalyst removal effect is good, and therefore, the reproducibility of quality of the resulting purified polymer is excellent.

In the process of the present invention, the formation of a first emulsion of the W/O type is effected by adding water in the presence of a surfactant. The order of addition of the surfactant and water is optional. It is possible to add them to a polymer solution simultaneously or after a previous mixing. Any surface active agents capable of forming W/O type emulsions can be used for this purpose. Specific examples are polyoxyalkylene alkyl ethers such as polyoxyethylene lauryl ether, polyoxyethylene oleyl ether, polyoxyethylene stearyl ether and polyoxyethylene octyl phenol ether; polyoxyalkylene alkyl esters such as polyoxyethylene monolaurate; sorbitan esters such as sorbitan sesquioleate; and polyoxyalkylene sorbitan esters such as polyoxyethylene sorbitan monooleate and polyoxyethylene sorbitan monolaurate. These are nonionic surfactants, but if desired, cationic, anionic and amphoteric surface active agents can be used conjointly with them.

It is preferable that the formation of the first emulsion should be carried out under stirring conditions. It is advisable to maintain the emulsion under the stirring condition for a while after its formation to ensure a sufficient contact between an oil phase and a water phase. Usually, the time of contacting is at least 10 minutes, for instance, 10-150 minutes, preferably 30-90 minutes for obtaining good results. If desired, the emulsion can be maintained under the stirring conditions for a longer time, but this is not necessary.

Usually, water is added to a polymer solution in an amount of 0.05 to 0.4 part by volume per part of the polymer solution (0.07 to 0.6 part by weight), preferably 0.1 to 0.3 part by volume (0.15 to 0.43 part by weight), and they are mixed with each other by sufficient stirring.

Amounts of the surfactants are usually 0.005 to 0.3% by weight based on the water added. Usually, the resulting emulsion is of the W/O type if the amounts of water are within the above-specified range. However, depending upon the kind of the resulting polymer, the kind of solvent, the viscosity of the polymer solution and other factors, it could be of the O/W type. In this case, the amount of water is reduced to form a W/O type first emulsion.

Fresh water is added to the first emulsion, followed by stirring to cause phase inversion of the W/O type first emulsion to the O/W type second emulsion. It is preferable that an additional amount of the surfactant is added in the formation of the second emulsion, or the surfactant is used in an amount more than necessary for the formation of the first emulsion and the excess surfactant is used in the formation of the second emulsion. In general, if water is added in a combined amount of 0.5 part or more by volume per part of the polymer solution (0.7 part or more by weight), the resulting emulsion becomes the W/O type, and it is not necessary to add it in an amount more than 2 parts by volume (0.3 part by weight or more). After phase inversion, the stirring of the emulsion is stopped and the emulsion is allowed to stand, whereby it is separated into the polymer solution and a water phase. Water is discharged from the bottom of the stirring vessel, for instance.

The use of the surface active agents in the process of the present invention serves to lower the viscosity of a polymer solution to be treated and advantageously promote contact with water. Unless the water added before phase inversion contains a surfactant, a W/O type emulsion is not formed and therefore it is difficult to remove catalyst residues. Better results are obtained if water is to be added at the time of phase inversion contains a surfactant, but it need not always contain a surfactant.

When solvent is separated from the so treated polymer solution by a known method such as steam stripping, a solid polymer having little catalyst residues can be recovered.

When a continuous operation is desired, two stirring vessels and a separating vessel are provided. In a first vessel, amounts of a polymer solution, water and a surfactant to be fed are determined so as to provide a W/O type emulsion. The first W/O type emulsion is introduced to a second vessel, where by further addition of water, phase inversion is induced to form an O/W type second emulsion. After maintaining it in the O/W type for a predetermined period of time, it is led to the separating vessel where by allowing the emulsion to stand, a water layer is separated from an oil layer with ease. It is preferable that the maintenance of this second emulsion should be also be carried out under stirring, and the same maintenance time as in the case of the first emulsion can be employed.

The ratio of water to polymer solution and amounts of the emulsifier employed in this continuous process may be the same as those used in a batchwise operation.

The invention will further be described with reference to the following examples. Unless departing from the spirit and scope of the invention herein described, the present invention is in no way limited by these examples. All pasts are parts by volume unless otherwise specified.

In the following examples and comparative examples, the determination of the type of an emulsion (W/O or O/W) and the determination of a time at which phase inversion occurs were made by detecting the electrical conductivity of the emulsion and its changes. In a W/O type emulsion, electrical conductivity is hardly detectable since the polymer solotion is a non-condoctive material is continuous. On the other hand, in an O/W type emulsion, the electrical conductivity is clearly detected because the aqueous solution of surfactant as a conductive material is continuous. The time of occurrence of phase inversion is known from changes in the electrical conductivity.

Example 1 and Comparative Examples 1 to 3

Thirty parts of a 0.05 wt. percent aqueous solution of a polyoxyethylene alkyl phenol ether (Emulgen 910, a tradename for a nonionic surface active agent) were added gradually to 100 parts of a polymer solution in hexane having a viscosity of 8,800 centipoises which had been obtained by copolymerising ethylene, propylene and dicyclopentadiene in hexane in the presence of ethylaluminium sesquichloride and vanadium oxytrichloride, while stirring at about 1000 r.p.m. to form a W/O type emulsion. The resulting emulsion was maintained under stirring for 60 minutes. Phase inversion was induced by addition of 170 parts of the same surfactant aqueous solution to form an O/W type emulsion which was stirred for 10 minutes.

The resulting emulsion was allowed to stand for about one hour to separate it into the polymer solution and the aqueous solution of the surfactant. The polymer solution was subjected to a known steam stripping to remove the solvent. A white polymer was obtained. The ash content of the polymer was analysed with the results shown in Table 1. The ash content after catalyst extraction procedure was excellent as tabulated.

For comparison, the polymer solution was purified by extracting the catalyst from an O/W emulsion without causing phase inversion from the W/O type to the O/W type (Comparative Example 1). The ash content analysis showed that the ash content of the resulting polymer was 324 p.p.m. as $Al_2O_3$ and 60 p.p.m. as $V_2O_5$. The treating conditions were the same as in Example 1 in which phase inversion was effected. The O/W volume ratio was 1/2, and the stirring was conducted for 60 minutes. When the amount of vanadium, calculated as $V_2O_5$, exceeded 30 p.p.m., the color of the polymer deteriorated, giving a lowered commercial value.

Separately, the procedure of Example 1 was repeated except that the emulsifier was not used (Comparative Example 2). It was found that the ash content of the polymer after treatment is 320 p.p.m. as $Al_2O_3$ and 62 p.p.m. as $V_2O_5$, indicating a bad catalyst extraction effect.

The color of the dried polymer obtained in Example 1 in which phase inversion was effected was pure white, but the dried polymers obtained in Comparative Examples 1 and 2 (O/W type) were colored.

Furthermore, in the procedure of Example 1, a W/O type emulsion formed by using the surface active agent was maintained under stirring for 60 minutes, and subjected to a centrifugal separation to obtain an oily fraction. It was subjected to steam stripping in the same manner as in Example 1. (Comparative Example 3.)

The results obtained in these Comparative Examples 1–3 are given in Table 1 together with those of Example 1.

TABLE 1

| Examples | Ash content before catalyst extraction | | Ash content after catalyst extraction | | Color of polymer after catalyst extraction [1] |
|---|---|---|---|---|---|
| | $Al_2O_3$ (p.p.m.) | $V_2O_5$ (p.p.m.) | $Al_2O_3$ (p.p.m.) | $V_2O_5$ (p.p.m.) | |
| Example 1 | 3,450 | 405 | 40 | 0 | White. |
| Comparative Example: | | | | | |
| 1 | 3,450 | 405 | 324 | 60 | Light yellowish green. |
| 2 | 3,450 | 405 | 320 | 62 | Do. |
| 3 | 3,450 | 405 | 125 | 39 | Light yellow. |

[1] Each polymer after drying was hot pressed into a circular form with a thickness of 5 mm. and a diameter of 35 mm. for 20 minutes at a temperature of 120° C. and a pressure of 165 kg./cm.² The color of the obtained test piece was ascertained by the naked eye.

Examples 2 to 3 and Comparative Examples 4 to 7

A part of a hexane solution of the same polymer as used in Example 1 was uniformly diluted with hexane to form a polymer solution having a viscosity of 5,000 centipoises. Another part was made into a polymer solution having a viscosity of 20,000 centipoises by volatilising some portion of hexane and concentrating the solution.

These polymer solutions were subjected to the same treatment as in Example 1. The obtained polymers had an ash content shown in Table 2. It is seen from the results that solvent residues can be removed even from a polymer solution of high viscosity such as 20,000 centipoises without being particularly affected by the viscosity of the solution.

For comparison, Table 2 also show the results obtained when Examples 2 and 3 were repeated except that an O/W type emulsion was used from start to end (Comparative Examples 4 and 5), and when Examples 2 and 3 were repeated except that the operation was conducted in accordance with Comparative Example 3 (Comparative Examples 6 and 7).

TABLE 2

| Examples | Viscosity of the solution (centipoises) | Ash content before polymer extraction | | Ash content after catalyst extraction | | Color of polymer after catalyst extraction |
|---|---|---|---|---|---|---|
| | | $Al_2O_3$ (p.p.m.) | $V_2O_5$ (p.p.m.) | $Al_2O_3$ (p.p.m.) | $V_2O_5$ (p.p.m.) | |
| Example 2 | 5,000 | 3,450 | 405 | 48 | 11 | White. |
| Comparative Example: | | | | | | |
| 4 | 5,000 | 3,450 | 405 | 299 | 59 | Light yellowish green. |
| 6 | 5,000 | 3,450 | 405 | 250 | 41 | Light yellow. |
| Example 3 | 20,000 | 3,450 | 405 | 63 | 10 | White. |
| Comparative Example: | | | | | | |
| 5 | 20,000 | 3,450 | 405 | 340 | 51 | Light yellowish green. |
| 7 | 20,000 | 3,450 | 405 | 274 | 48 | Light yellow. |

Example 4 and Comparative Examples 8 and 9

Twenty parts of a 0.10 wt. percent aqueous solution of a nonionic surface active agent Emulgen 910 were added to 100 parts of a solution in hexane of a copolymer of ethylene, propylene and 5-ethylidene-2-norbornene obtained in the same manner as in Example 1. They were vigorously stirred to form a W/O type emulsion, which was then stirred for 60 minutes. While stirring, 180 parts of the same surface active agent were added gradually to induce phase inversion, thereby giving and O/W type emulsion which was then stirred for 10 minutes.

The polymer solution was separated by allowing the emulsion to stand, and subjected to steam stripping. The obtained white polymer had an ash content shown in Table 3 below.

For comparison, Table 3 also shows the results obtained when Example 4 was repeated except that the operation was conducted in the same manner as in Comparative Example 1 (Comparative Example 8), and when Example 4 was repeated except that the operation was conducted in the same manner as in Comparative Example 3 (Comparative Example 9).

TABLE 3

| Examples | Ash content before catalyst extraction | | Ash content after catalyst extraction | | Color of polymer after catalyst extraction |
|---|---|---|---|---|---|
| | $Al_2O_3$ (p.p.m.) | $V_2O_5$ (p.p.m.) | $Al_2O_3$ (p.p.m.) | $V_2O_5$ (p.p.m.) | |
| Example 4 | 2,140 | 312 | 73 | 7 | White. |
| Comparative Example: | | | | | |
| 8 | 2,140 | 312 | 240 | 53 | Light yellowish green. |
| 9 | 2,140 | 312 | 204 | 42 | Light yellow. |

Examples 5 to 6 and Comparative Example 10

Two stirring vessels were provided in series. By means of a metering pump, a polymer solution and an aqueous solution of a surfactant were fed into a first vessel, and an aqueous solution of a surfactant, into a second vessel, both continuously and at a constant rate. In addition, it was so designed that the fluids could be overflowed via the first and second vessels.

A hexane solution (with a viscosity of 15,000 centipoises) of a copolymer of ethylene, propylene and 5-ethylidene-2-norbornene obtained in the same manner as in Example 4 and a 0.05 wt. percent aqueous solution of a nonionic surfactant Emulgen 910 were fed continuously at a volume ratio of 100:20 into the first vessel where a W/O type emulsion was formed.

An aqueous solution of the same surfactant was continuously fed into the second vessel at a volume ratio of 90:100 as against the polymer solution in the first vessel, whereby the W/O type emulsion flowing in from the first vessel was converted to an O/W type emulsion by phase inversion.

After the inside of each vessel reached a steady state, the polymer solution was separated by allowing the O/W type emulsion over flowing from the second vessel to stand, and then subjected to steam stripping. The resulting polymer was recovered.

In Example 5, the residence time in the first vessel was 60 minutes, while in Example 6, it was 30 minutes. The ash content analysis values of the polymers obtained are shown in Table 4.

For comparison, Table 4 also shows the results obtained when Example 5 was repeated except that the same operation as in Comparative Example 1 was conducted in the first vessel (Comparative Example 10).

TABLE 4

| Examples | Ash content before catalyst extraction | | Ash content after catalyst extraction | | Color of polymer after catalyst extraction |
|---|---|---|---|---|---|
| | $Al_2O_3$ (p.p.m.) | $V_2O_5$ (p.p.m.) | $Al_2O_3$ (p.p.m.) | $V_2O_5$ (p.p.m.) | |
| Example 5 | 2,360 | 311 | 50 | 7 | White. |
| Comparative Example 10 | 2,360 | 311 | 845 | 95 | Yellowish green. |
| Example 6 | 2,360 | 311 | 137 | 21 | White. |

Examples 7 to 10

Example 1 was repeated except that different polymers and surfactants indicated in Table 5 were used. The results are shown in Table 5.

TABLE 5

| Examples | Polymer solution | | | Surface active agent | Ash content before catalyst extraction | | Ash content after catalyst extraction | | Color of polymer after catalyst extraction |
| --- | --- | --- | --- | --- | --- | --- | --- | --- | --- |
| | Polymer | Catalyst | Solvent | | $Al_2O_3$ (p.p.m.) | $V_2O_5$ (p.p.m.) | $Al_2O_3$ (p.p.m.) | $V_2O_5$ (p.p.m.) | |
| 7 | Ethylene/propylene/ ethylidenenorbornene. | Ethylaluminium sesquichloride and vanadium oxytrichloride. | Hexane | Polyoxyethylene lauryl ether. | 3,450 | 405 | 52 | 11 | White. |
| 8 | do | do | do | Polyoxyethylene sorbitan monolaurate. | 3,450 | 405 | 47 | 10 | Do. |
| 9 | Ethylene/propylene | do | do | Polyoxyethylene nonylphenyl ethers. | 2,870 | 320 | 58 | 8 | Do. |
| 10 | do | do | do | Polyoxyethylene sorbitan monoleate. | 2,870 | 320 | 60 | 5 | Do. |

We claim:

1. A process for the purification of a polymer solution which comprises, in a first step, mixing for a period of at least 10 minutes under conditions of stirring, a polymer solution obtained by the solution polymerization of one or more unsaturated hydrocarbon monomers in a water-immiscible, inert organic solvent in the presence of a Ziegler-type polymerization catalyst soluble in said solvent, said solution containing dissolved polymer and catalyst with water in the presence of a surface active agent, the water and surface active agent being mixed in an amount so as to form a first emulsion of the water-in oil type, said first emulsion consisting essentially of water droplets containing the predominant portion of said catalyst and catalyst decomposition products in said polymer solution containing said polymer; in a second step, mixing said first emulsion under conditions of stirring with additional water in an amount so as to induce phase inversion of said first emulsion and in the presence of sufficient surface active agent to produce upon settling a two phase system of the oil-in-water type, said two phase system consisting essentially of a water phase containing the predominant portion of said catalyst and catalyst decomposition products and a polymer solution phase consisting essentially of said organic solvent and polymer dissolved therein; and, thereafter, separating said water phase from said two phase system.

2. The process of claim 1 wherein said polymer is selected from the group consisting of an ethylene/propylene copolymer, copolymers of ethylene, propylene and a non-conjugated diene, polybutadiene and polyisoprene.

3. The process of claim 1 wherein said first emulsion is maintained under stirring for at least 10 minutes.

4. The process of claim 1 wherein the surface active agent is a nonionic surface active agent or a combination of the nonionic surface active agent and a cationic surface active agent, an anionic surface active agent or an amphoteric surface active agent.

5. The process of claim 1 wherein the combined amount of water used in the formation of said first emulsion and two phase system is 0.5 to 2 parts by volume per part of said polymer solution.

6. The process of claim 1 wherein the amount of water used in the formation of said first emulsion is 0.05 to 0.4 part by volume per part of said polymer solution.

7. The process of claim 1 wherein said polymerization catalyst is selected from the group consisting of compounds of metals of Groups IV-VIII of the Period Table and organo-metallic compounds of metals of Groups I-III of the Periodic Table.

8. The process of claim 4 wherein said surface active agent is present in an amount of 0.005 to 0.3% by weight based upon the weight of the added water.

References Cited
UNITED STATES PATENTS

| | | | |
| --- | --- | --- | --- |
| 2,967,857 | 1/1961 | Pfeifer | 260—94.9 |
| 3,000,871 | 9/1961 | Engel | 260—93.7 |
| 3,045,002 | 7/1962 | Sommer | 260—93.7 |
| 3,070,588 | 12/1962 | Klink et al. | 260—94.9 |
| 3,083,192 | 3/1963 | Davison et al. | 260—93.7 |
| 3,436,386 | 4/1969 | Harris | 260—93.7 |

JOSEPH L. SCHOFER, Primary Examiner

W. F. HAMROCK, Assistant Examiner

U.S. Cl. X.R.

260—88.2 S, 93.7, 94.7 R, 96, 94.9 F